United States Patent [19]

Johnson, Jr.

[11] 4,078,194
[45] Mar. 7, 1978

[54] ARRANGEMENT FOR CONTROLLING THE SPEED OF A MOTOR

[75] Inventor: Eugene P. Johnson, Jr., Arlington, Mass.

[73] Assignee: Micro Communications Corporation, Waltham, Mass.

[21] Appl. No.: 681,144

[22] Filed: Apr. 28, 1976

[51] Int. Cl.² ............................................. H02P 5/00
[52] U.S. Cl. ................................................. 318/331
[58] Field of Search .......... 318/331, 345 AB, 345 CA

[56] References Cited

U.S. PATENT DOCUMENTS

| | | | |
|---|---|---|---|
| 3,181,050 | 4/1965 | Berman | 318/331 |
| 3,358,204 | 12/1967 | Bradley | 318/331 |
| 3,475,672 | 10/1969 | Oltendorf | 318/331 |
| 3,649,895 | 3/1972 | Joslyn | 318/345 CA |
| 3,705,337 | 12/1972 | Grabl | 318/331 |
| 3,716,771 | 2/1973 | Maynard | 318/331 |
| 3,878,446 | 4/1975 | Brandt | 318/331 |

*Primary Examiner*—James R. Scott
*Assistant Examiner*—Eugene S. Indyk
*Attorney, Agent, or Firm*—Jacobs & Jacobs

[57] ABSTRACT

A motor speed control arrangement in which the back EMF of the motor is sensed in all operating modes and is used as a measure of the motor speed. The effect of commutator ripple due to varying rotor resistance is compensated by adjustment of resistors associated with an operational amplifier, so that the output of the amplifier provides the average value of the back EMF without distortion. A comparator compares the output of the amplifier with an input reference signal denoting the desired speed of the motor and applies an error signal to a driving circuit which drives the motor with current in a manner that tends the error signal to attain minimum or zero value.

10 Claims, 6 Drawing Figures

ARRANGEMENT FOR CONTROLLING THE SPEED OF A MOTOR

BACKGROUND OF THE INVENTION

Devices for controlling the speeds of motors are already known in the art. A wide range of such devices used various parameters as bases for adjusting the motor speed so as to correspond to a desired value.

However, in control loops for regulating the speed of motors, the parameters used as the bases for speed control have not been representative of the true speed of the motor. As a result, accurate speed control of a motor was not obtained, heretofore, because the basic parameter for controlling the speed was inaccurate.

Accordingly, it is an object of the present invention to provide an arrangement for controlling the speed of a motor, in which an accurate measure of the motor speed is obtained by sensing the back EMF of the motor.

Another object of the present invention is to provide an arrangement of the foregoing character which may be economically fabricated and maintained in service.

A further object of the present invention is to provide an arrangement as described which has a substantially long operating life.

A still further object of the present invention is to provide a motor speed control arrangement in which the speed of a motor in a tape recorder may be accurately maintained at a predetermined magnitude so as to result in precision recording and playback.

SUMMARY OF THE INVENTION

The objects of the present invention are achieved by providing a sampling resistor connected in series with the rotor of the motor. The voltage appearing at the terminals of the sampling resistor are applied to an operational amplifier having a feedback resistor and an input resistor. The input and feedback resistors are adjusted so that the average value of the amplifier output signal is accurately proportional to the back EMF or speed of the rotor. The input and feedback resistors are also selected for the purpose of compensating against the commutator effects of the rotor.

The output of the amplifier is applied to one input of a comparator which compares this amplifier output to a predetermined input reference signal representing the desired motor speed. The comparator applies a resultant error signal to a motor driving circuit which applies current to the rotor in a manner which tends the error signal to become a minimum or null value. When minimum error signal has been achieved, the speed of the motor is substantially equal to the desired speed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
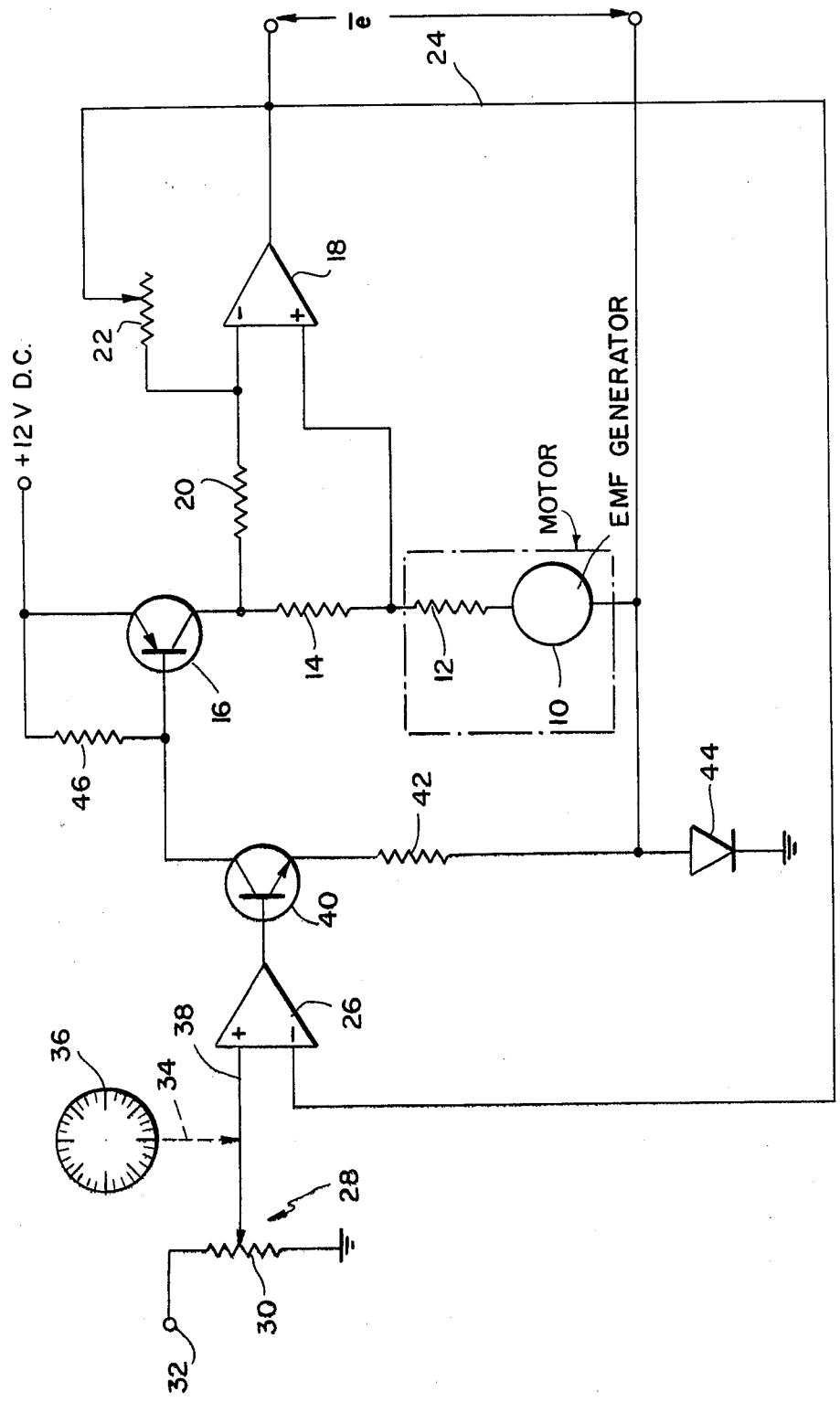
FIG. 1 is a schematic circuit diagram of the motor speed control arrangement, in accordance with the present invention.

Referring to FIG. 1 of the drawings, the motor armature 11 has an equivalent circuit shown schematically by a resistance 12 connected in series with a back EMF generator 10. A sampling resistor 14, furthermore, is connected in series with the rotor, and to the collector of a transistor 16. The emitter of this transistor 16 is connected to the power supply voltage shown in the drawing as, for example, +12V.

The voltages appearing at the terminals of the sampling resistor 14 are applied to an operational amplifier 18. An input resistor 20 is connected between one input of the operational amplifier 18, and the junction between the sampling resistor 14 and the collector of the transistor 16. The other input of the operational amplifier 18 is connected to the junction between the rotor 10 and the sampling resistor 14. This junction between rotor 10 and sampling resistor 14, may comprise one terminal of the motor.

A feedback resistor 22 is connected between the output of the operational amplifier 18, and the junction between the resistor 20 and the respective input of the amplifier.

The output 24 of the amplifier 18 is applied to one input of a summing amplifier 26 which serves as a comparator or differential device. The second input of this summing amplifier 26 is connected to the sliding contact of a potentiometer 28 having a winding 30 to which a constant reference voltage is applied. For this purpose, the power supply voltage may be applied to the terminal 32, for example. The mechanical shaft of the potentiometer, which is shown schematically in the drawing as element 34 may be positioned in accordance with the desired speed of the motor. The desired motor speed and the potentiometer shaft position may be related by an indicating dial face 36, for example, so that the electrical voltage appearing at the sliding contact of the potentiometer and input 38 of the summing amplifier 26, represents the desired speed. The dial face 36 may be calibrated to compensate against nonlinearity effects of the potentiometer and thereby provide an accurate electrical signal to the input 38, which represents the desired speed of the motor.

The output of the summing amplifier or comparator 26, is applied to a second transistor 40 with collector connected to the base of the transistor 16. The emitter of transistor 40 is connected into one terminal of a resistor 42. The other terminal of this resistor 42 is connected to a diode 44 and one terminal of the rotor 10. The diode 44 is, in turn, connected to ground potential. A biasing resistor 46, furthermore, is connected between the base and emitter of transistor 16.

In the operation of the arrangement in accordance with the present invention in, for example, a tape recorder, the mechanical load torque is substantially constant and independent of the motor speed. The electrical torque, at the same time, is substantially proportional to the armature current which is also substantially constant and independent of motor speed. To control and regulate the motor speed, the instantaneous speed of the rotor is measured or sensed, and adjustments are then carried out so as to bring the motor speed to the desired magnitude. The instantaneous motor speed is measured by sensing the back EMF and setting the resistors 20 and 22 so that the back EMF is substantially proportional to the motor speed in accordance with the following operating principle:

From the circuit diagram of FIG. 1, the back EMF $e$, is given by the relationship $$e = (K\omega + IR_{12}) - IR_{14}[R_{22}/R_{20}] \quad (1)$$

where $\omega$ = motor speed
$K$ = proportionality constant
$I$ = armature current
$R_{12}$, $R_{14}$, $R_{20}$ and $R_{22}$ are the values of resistors 12, 14, 20, and 22 respectively.

If resistor 14 is of known fixed value and resistors 20 and 22 are adjusted or set so that the following condition is satisfied, $$R_{12} - R_{14}[R_{22}/R_{20}] = 0 \quad (2)$$

then it may be seen that the resultant relationship for the back EMF is obtained as follows:

$$e = K\omega \quad (3)$$

It may be seen, therefore, that the resistors 20 and 22 may be adjusted so that the back EMF $e$ is directly proportional to the motor speed.

In practice, the internal resistance of the rotor, $R_{12}$, is not constant but will vary instead with time during operation of the motor. This results from the commutation effect of the rotor, and it may be seen that the relationship (2) above will not be zero at all times when $R_{12}$ varies with time in the operation of the motor. The variation of $R_{12}$ results in a noise factor which may be introduced into equation (3) as follows:

$$e = K\omega + I\Delta R_{12} \quad (4)$$

where $I\Delta R_{12}$ is the noise factor due to commutation effect.

Figure 2:
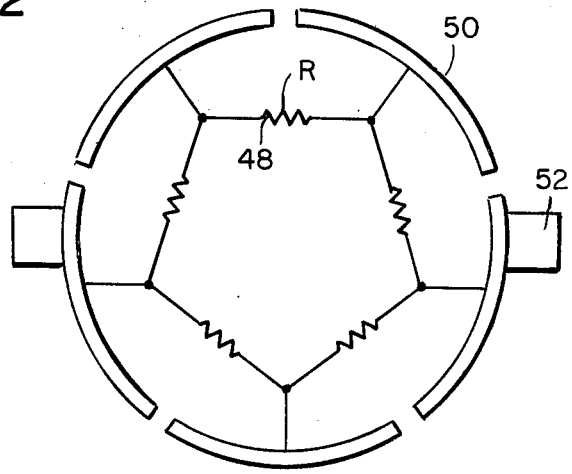
FIG. 2 is a schematic circuit diagram of the rotor in the motor in FIG. 1.
Figure 3:
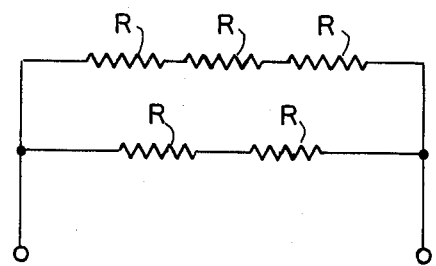
FIG. 3 is a circuit diagram and shows the equivalent circuit across the brushes of the motor when the commutator segments are not shorted.

The character of the noise factor, $I\Delta R_{12}$ may be observed by referring to FIG. 2. The latter shows a pentagon wound rotor in which five windings are connected in the pentagon manner shown. The vertices of the pentagon are connected to commutator segments 50. These segments are contacted by brushes 52 in the conventional manner. Only the winding resistances are indicated in FIG. 2. The EMF generators and other parameters such as inductance are neglected here. If the windings 48 have substantially equal resistance values, R, then the equivalent resistance appearing across the brushes 52 may be represented as shown in FIG. 3, when adjacent commutator segments are not shorted. In this configuration, a series circuit of 3R is in parallel with a series circuit of 2R. The resultant equivalent resistance is 6/5 R.

Figure 4:
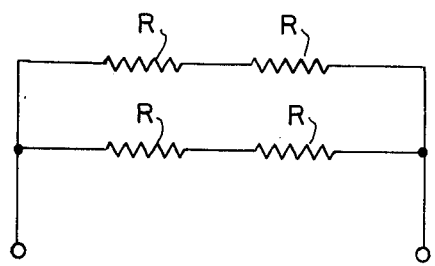
FIG. 4 is a circuit diagram and shows the equivalent circuit across the brushes of the motor when the commutator segments are shorted.

When, on the other hand, any adjacent pair of commutator segments 50 are shorted by either of the brushes 52, the equivalent resistance across the brushes may be represented as shown in FIG. 4. In this configuration, the equivalent resistance has the value R.

Figure 5:
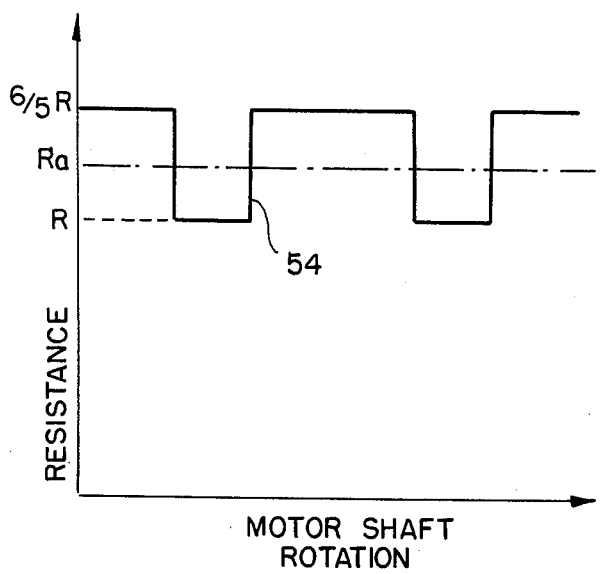
FIG. 5 is a graphical representation of the rotor resistance as a function of the angular rotation of the rotor shaft.

It may be seen, therefore, that the equivalent resistance across the brushes, representing the rotor resistance, varies between 6/5 R and R. In a DC motor which is ironless and of the permanent magnet type, in accordance with the present invention, this resistance may vary between 20 ohms and 16 ⅔ ohms. A graphical representation of the rotor resistance with angular rotation of the motor shaft is shown in FIG. 5. With the use of the pentagon wound motor, in accordance with the present invention, ten ripples or pulses 54 are obtained for every revolution of the motor shaft.

The resistors 20 and 22 which influence the gain of the amplifier 18, are selected so that the gain of the amplifier stage corresponds to an average between the values of 6/5 R and R of rotor resistance 12, in order to satisfy Eq. 2 on an average basis. This average value of the rotor resistance is denoted by $R_a$ in FIG. 5.

Figure 6:
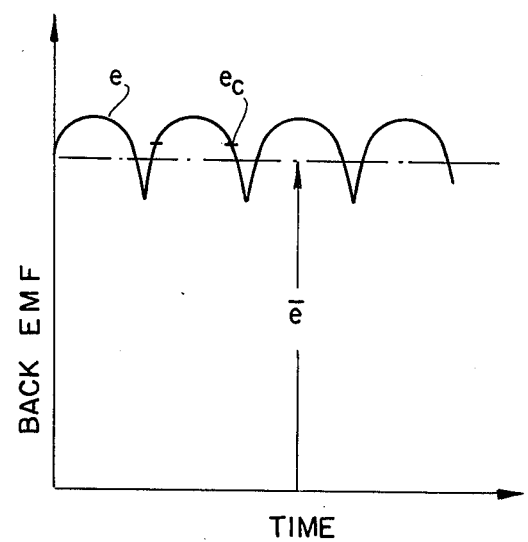
FIG. 6 is a graphical representation and shows instantaneous and average values of the back EMF as a function of time during operation of the motor.

Due to the noise factor $I\Delta R_{12}$ arising from the variation in the rotor resistance, the measure of speed obtained at the output of amplifier 18 has the waveform shown in FIG. 6. The amplitude of the ripple of this waveform is substantially constant and independent of the motor speed. Consequently, this ripple or noise amplitude is independent of the average value of the back EMF denoted by $\bar{e}$ in FIG. 6.

If one terminal of the rotor 11 were to be grounded, then the amplifier 18 would clip the waveform at the level $e_c$, at low speeds of the motor, because the amplifier cannot supply the necessary negative voltage when a power supply is provided only in the form of +12V and ground potential, for example. Such a power supply is provided in conjunction with the present invention, as shown in FIG. 1.

To prevent clipping of the waveform of the back EMF, as noted above, the diode 44 is connected between the terminal of the rotor 10 and ground potential. An equivalent impedance may be substituted for the diode 44 for this purpose. This diode or equivalent impedance is used to provide the necessary offset voltage that is sufficiently large to allow the full magnitude of the ripple in FIG. 6 to appear at the output of the amplifier 18, without distortion of the average value. Accordingly, the element 44 serves the function of allowing the amplifier 18 to have an output representing $\bar{e}$ without distortion.

In selecting the sampling resistor 14, the value of this resistor is chosen as small as practical for the purpose of preserving the available power supply as, for example, +12V. At the same time, the value of the sampling resistor must be known and held constant. The actual value of this resistor, however, is not critical. The rotor resistance values as illustrated in FIG. 5 must also be known to allow adjustment of the resistors 20 and 22 for the purpose of satisfying equation (2).

The transistor 40 is selected to have a high $\beta$, so that the collector and emitter currents of this transistor are substantially the same. With the emitter resistor 42, the emitter current of transistor 40 is substantially proportional to the error voltage at the output of the amplifier 26, and therefore the driving current applied to the motor is made proportional to this error voltage. The $\beta$ of transistor 16 divided by the value of resistor 42 is the coefficient of proportionality of the error voltage to the motor current.

To obtain rapid starting and stopping characteristics of the motor, it has been found desirable to drive the motor with current control, as in the present invention, rather than with voltage control.

The average value of the back EMF as provided by the output of amplifier 18, is a true measure of the motor speed, in view of the condition that resistors 20 and 22 have been set or adjusted to satisfy equation (2). The output 24 of the amplifier 18 is fed back to the comparator or summing amplifier 26 which compares the output 24 with the command input 38. The error voltage obtained at the output of the amplifier 26, is held substantially small as a result of the high gain or β of the transistors 40 and 16. The result of the small error voltage and high gain transistors, is that substantially large current is obtained for driving the motor. With this result, a highly accurate measurement of the motor speed is obtained for the purpose of establishing accurate motor speed control and regulation in accordance with the present invention.

Without further analysis, the foregoing will so fully reveal the gist of the present invention that others can by applying current knowledge, readily adapt it for various applications without omitting feautures that, from the standpoint of prior art, fairly constitute essential characteristics of the generic or specific aspects of this invention, and therefore, such adaptations should and are intended to be comprehended within the meaning and range of equivalence of the following claims.

I claim:

1. An arrangement for controlling the speed of a motor comprising, in combination, a motor with commutator and brushes in contact with said commutator; means for measuring the back EMF of said motor and having an output signal corresponding to the undistorted average value of said back EMF, said undistorted average value being substantially proportional to the true speed of said motor; comparator means having a first input connected to said output of said measuring means; means for applying to a second input of said comparator means a signal corresponding to a desired speed of said motor, said comparator comparing said first and second input and having an output corresponding to the difference of said first and second inputs, said difference comprising an error voltage at the output of said comparator means; and motor driving means connected between the output of said comparator means and said motor for driving said motor with current to minimize said error voltage; said motor having a rotor carrying said commutator, the resistance of said rotor across said brushes varying between upper and lower limits during one rotation of the rotor, said commutator comprising a plurality of commutator segments, the variation of said resistance across said brushes being dependent on said segments becoming shorted by said brushes and remaining unshorted when said rotor rotates, said average value corresponding to the average of equivalent resistance across said brushes during one revolution of said rotor, said undistorted average value of said back EMF being independent of said variation of said rotor resistance.

2. The arrangement as defined in claim 1 wherein said measuring means comprises a first resistor connected in series with said motor; an operational amplifier having one input connected to the junction of said first resistor and said motor; a second resistor connected between a second input of said operational amplifier and the terminal of said first resistor opposite said junction; and a third resistor connected between said second input of said operational amplifier and the output of said operational amplifier.

3. The arrangement as defined in claim 1, including DC power supply means having positive and ground potentials and being connected to said motor through said measuring means.

4. The arrangement as defined in claim 3 including impedance means connected between one terminal of said motor and ground potential.

5. The arrangement as defined in claim 1 wherein said motor comprises a pentagon wound motor with commutator segments and brushes in contact with said segments.

6. The arrangement as defined in claim 1 wherein said comparator means comprises a summing amplifier.

7. The arrangement as defined in claim 6 including a first transistor with base connected to the output of said summing amplifier; an emitter resistor connected in series with the emitter of said first transistor; impedance means connected in series with said emitter transistor and having one terminal connected to ground potential; means for connecting one terminal of said motor to the junction of said emitter resistor and said impedance means; and DC power supply means having one terminal at ground potential and having a positive terminal connected to the collector of said first transistor.

8. The arrangement as defined in claim 7 including a second transistor with base connected to the collector of said first transistor, the collector of said second transistor being connected to said measuring means; the emitter of said second transistor being connected to said positive terminal of said DC power supply means.

9. The arrangement as defined in claim 8 including in said measuring means a first resistor connected between the collector of said second transistor and said motor; an operational amplifier with one input connected to the junction of said motor and said first resistor; a second resistor connected between a second input of said operational amplifier and the collector of said second transistor; and a third resistor connected between the output of said operational amplifier and the second input of said operational amplifier, said second and third resistors having values so that the output of said operational amplifier corresponds to the undistorted average value of said back EMF.

10. An arrangement as defined in claim 1, wherein said measuring means comprises a first resistor connected in series with said motor; an operational amplifier having one input connected to the junction of said first resistor and said motor; a second resistor connected between a second input of said operational amplifier and the terminal of said first resistor opposite said junction; a third resistor connected between said second input of said operational amplifier and the output of said operational amplifier; DC power supply means having positive and ground potentials and being connected to said motor through said measuring means; impedance means connected between one terminal of said motor and ground potential; said motor comprising a pentagon wound motor with commutator segments and brushes in contact with said segments; said comparator means comprising a summing amplifier; a first transistor with base connected to the output of said summing amplifier; an emitter resistor connected in series with the emitter of said first transistor; impedance means connected in series with said emitter transistor and having one terminal connected to ground potential; means for connecting one terminal of said motor to the junction of said emitter resistor and said impedance means; and DC power supply means having one terminal at ground potential and having a positive terminal connected to the collector of said first transistor; a second transistor with base connected to the collector of said first transistor, the collector of said second transistor being connected to said measuring means, the emitter of said second transistor being connected to said positive terminal of said DC power supply means; said measuring means including a first resistor connected between the collector of said second transistor and said motor; an operational amplifier with one input connected to the junction of said motor and said first resistor; a second resistor connected between a second input of said operational amplifier and the collector of said second transistor; and a third resistor connected between the output of said operational amplifier ane the second input of said operational amplifier, said second and third resistors having values so that the output of said operational amplifier corresponds to the undistorted average value of said back EMF.

* * * * *